United States Patent [19]

Borsuk

[11] Patent Number: 4,743,283

[45] Date of Patent: May 10, 1988

[54] ALTERNATING CURRENT ARC FOR LENSING SYSTEM AND METHOD OF USING SAME

[75] Inventor: Leslie M. Borsuk, Los Alamitos, Calif.

[73] Assignee: ITT Corporation, New York, N.Y.

[21] Appl. No.: 2,886

[22] Filed: Jan. 13, 1987

[51] Int. Cl.[4] .................... C03B 37/075; C03B 23/09; G02B 6/00

[52] U.S. Cl. .......................................... 65/2; 65/10.2; 65/11.1; 65/36; 65/40; 219/121 ER; 219/121 ET; 219/121 EX; 264/1.4; 350/96.18; 373/2; 373/24

[58] Field of Search ...................... 65/2, 10.2, 37, 11.1, 65/40, 36; 264/1.4, 2.7; 350/96.18; 373/2, 3, 4, 22, 23, 24; 219/121 EB, 121 EF, 121 EG, 121 ER, 121 ES, 121 ET, 121 EX

[56] References Cited

U.S. PATENT DOCUMENTS

| | | | |
|---|---|---|---|
| 2,184,740 | 12/1939 | Hansell | 373/40 X |
| 2,205,582 | 6/1940 | Steimel | 65/40 |
| 3,288,585 | 11/1966 | Clarke | 65/285 X |
| 3,684,474 | 8/1972 | Chisholm | 65/112 X |
| 4,345,930 | 8/1982 | Basola | 65/2 X |
| 4,589,897 | 5/1986 | Mathyssek et al. | 65/10.2 X |

FOREIGN PATENT DOCUMENTS

| | | | |
|---|---|---|---|
| 58-136008 | 8/1983 | Japan | 65/10.2 |
| 59-7303 | 1/1984 | Japan | 65/10.2 |

OTHER PUBLICATIONS

Fusion Mass Splices for Optical Fibers Using High-Frequency Discharge Journal of Lightwave Tech., vol. L+2 #1, Feb. 1984, Tachikura et al., pp. 25-31.

Primary Examiner—Robert L. Lindsay
Attorney, Agent, or Firm—T. L. Peterson

[57] ABSTRACT

A system is provided for forming an end of an optical fiber into a lens, which produces a lensed fiber having an especially smooth lens surface and high strength near the intersection of the lens and the rest of the fiber. A lens is formed by establishing a pair of electrodes on opposite sides of a fiber end portion and establishing an arc between the electrode tips for a sufficient current and time to melt the fiber end portion into a lens, with the arc being repeatedly terminated and restarted at a rate of thousands of times per second.

5 Claims, 2 Drawing Sheets

ALTERNATING CURRENT ARC FOR LENSING SYSTEM AND METHOD OF USING SAME

BACKGROUND OF THE INVENTION

Optical fibers can be coupled by melting their ends into lenses and placing the lenses in alignment and a predetermined distance apart. A lens can be formed by placing the tips of a pair of electrodes on opposite sides of a fiber end portion and establishing an arc between the electrodes that melts the fiber end portion into a lens. Early experiments by applicant involved the establishment of a DC arc of constant current, at a current amplitude continued for a period of time which resulted in a lens of a diameter greater than 25% of the fiber diameter and preferably about 50% greater than the fiber diameter. While the lens produced in this manner was able to couple light from one optical fiber to another, its mechanical reliability was not as great as hoped for. It was found that the lensed fiber had a weak spot lying a short distance behind the root of the lens, where the fiber was most likely to break. In pull tests, for example, the tensile strength of the fiber immediately behind the lens was only 40% of the tensile strength of the rest of the fiber. Also, multiple microscopic crevices could be observed in the lens surface, which could absorb moisture and develop cracks in the lens.

The use of an electric arc to melt the fiber into a lens was initially patterned on the use of electric arcs in fusing the ends of abutting optic fibers to splice them. In splicing, however, the fiber ends are merely softened with minimum deformation rather than being melted into balls, and in splicing problems are not encountered as to great weakening of the fiber behind the spliced ends or in the development of crevices which can cause damage to the fiber end.

In splicing, an arc of several milliamperes may be applied for a period of perhaps two seconds, to soften the ends of abutting fibers to splice them. An AC arc, which may be of low frequency, may be applied to produce a more uniform arc. When a similar setup was used in an attempt to melt an optic fiber into a lens, but with a higher current, the lensed region was found to be fairly brittle and to exhibit considerable crevices. A system for using an electric arc to melt a fiber end portion into a lens, which produced lensed fibers of high strength and smooth surfaces having a minimum amount of crevices, would be of considerable value.

SUMMARY OF THE INVENTION

In accordance with one embodiment of the present invention, a method and apparatus are provided for forming a lens at the end of an optical fiber, which produce a lensed fiber of high strength and a lens surface of high quality. A fiber end portion is melted into a lens by an electric arc continued for a plurality of seconds, wherein the arc is repeatedly terminated and restarted at a rate of a plurality of thousands of times per second. For optic fibers of a diameter between 0.005 and 0.010 inch, and lying in a cross-aperture of a contact, the average arc current is about 20 milliamperes, and continues for a period of between 3 and 7 seconds, and preferably with the arc current being alternated at a frequency of over 50 kHz.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
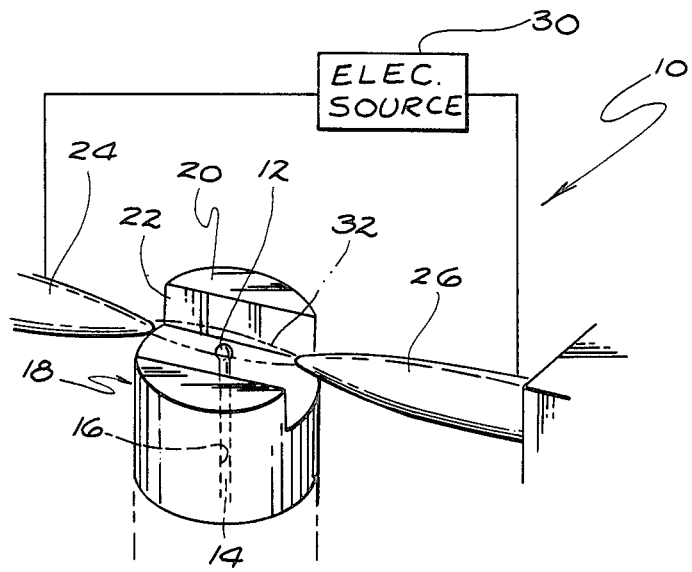
FIG. 1 is a perspective view of a system for forming a lens at the end of an optical fiber, constructed in accordance with the present invention.

FIG. 1 illustrates a system 10 for forming a lens 12 at the end of an optical fiber 14. The fiber is inserted through a longitudinal hole 16 of a contact 18 and fixed in place, with an end portion of the fiber lying about even with the tip 20 of the contact. The contact has a cross-aperture 22 near its end, in which most of the fiber end portion lies. A pair of electrodes 24, 26 are positioned on opposite sides of the optical fiber end portion, in alignment with the cross-aperture. An electrical source 30 is activated to produce a voltage between the electrodes, which results in the creation of an electric arc 32 between the tips of the electrodes, which passes across the fiber end portion to melt it. Afterwards, the contact 18 with the lensed fiber thereon can be placed with its tip 20 in abuttment with another contact, to couple light from a fiber in one contact to the fiber in the other contact.

Figure 2:
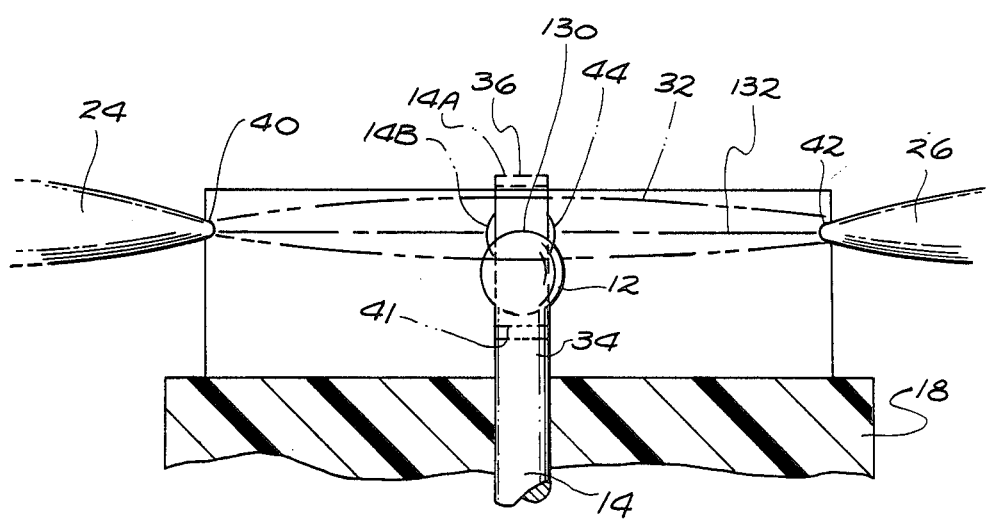
FIG. 2 is an enlarged sectional view of a portion of the system of FIG. 1.

FIG. 2 illustrates an optical fiber end portion 34 during the process of forming it into a lens. The optic fiber at 14A is positioned with its extreme forward end 36 slightly above the location at 32 where the brightest portion of the arc occurs. The arc is established between a pair of electrode tips 40, 42 and initially melts a location 44 below the fiber tip, to place the fiber in the configuration 14B. The tip of the fiber falls into the molten ball, as the ball descends and grows, until the ball reaches the position shown at 12. The arc is stopped at or slightly before that time, and the molten ball of glass hardens to form the lens 12. The three most common optical fiber sizes are 125 um (micrometers) equal to 0.005 inch, 140 um equal to 0.006 inch, and 250 um equal to 0.010 inch, with the lenses having a diameter about 50% greater than the optic fiber diameter.

Electric arcs have been used to splice pairs of optical fibers, by heating the fibers while their ends are in contact to melt them into one another. Such arcs were tried by applicant for melting optic fiber ends sufficiently to form lenses thereon. At first, DC arcs were used, which were difficult to control, and then relatively low frequency (e.g., 60 Hz) arcs were used. Lensed optic fibers formed by these methods were found to be weakened and to have defective lens surfaces. Applicant then formed lenses with the electrical source modified to produce progressively higher frequencies.

It was found that arcs that were repeatedly interrupted and reestablished at frequencies of a plurality of kilohertz produced lensed fibers which were stronger near the lens, and which had a surface with fewer crevices. It was found that at still further increases in arc frequency, of over 10 kHz, to 40 kHz, to 75 kHz the strength of the lensed fiber and the quality of the lens improved. At an alternating current frequency of 75 kHz, wherein the arc was repeatedly initiated and terminated at a rate of 150 kHz, the tensile strength of the lensed fiber was 80% of the tensile stength of a fiber without a lens. The region 41 at or immediately behind the root of the lens was found not to be brittle, and did not break off when the lens was pushed slightly sidewardly, as occured for lenses formed with a DC arc or a low frequency arc. It was found that the actual circuitry used produced progressively higher losses and heating when used at progressively higher frequencies, and 75 kHz was found to be satisfactory in that it produced a lensed fiber of high strength and good surface with a circuit of only moderate losses at the required current of about 20 milliamperes root mean square (about half as much current is used if the fiber end portion does not lie in the cross-aperture of a contact).

Figure 3:
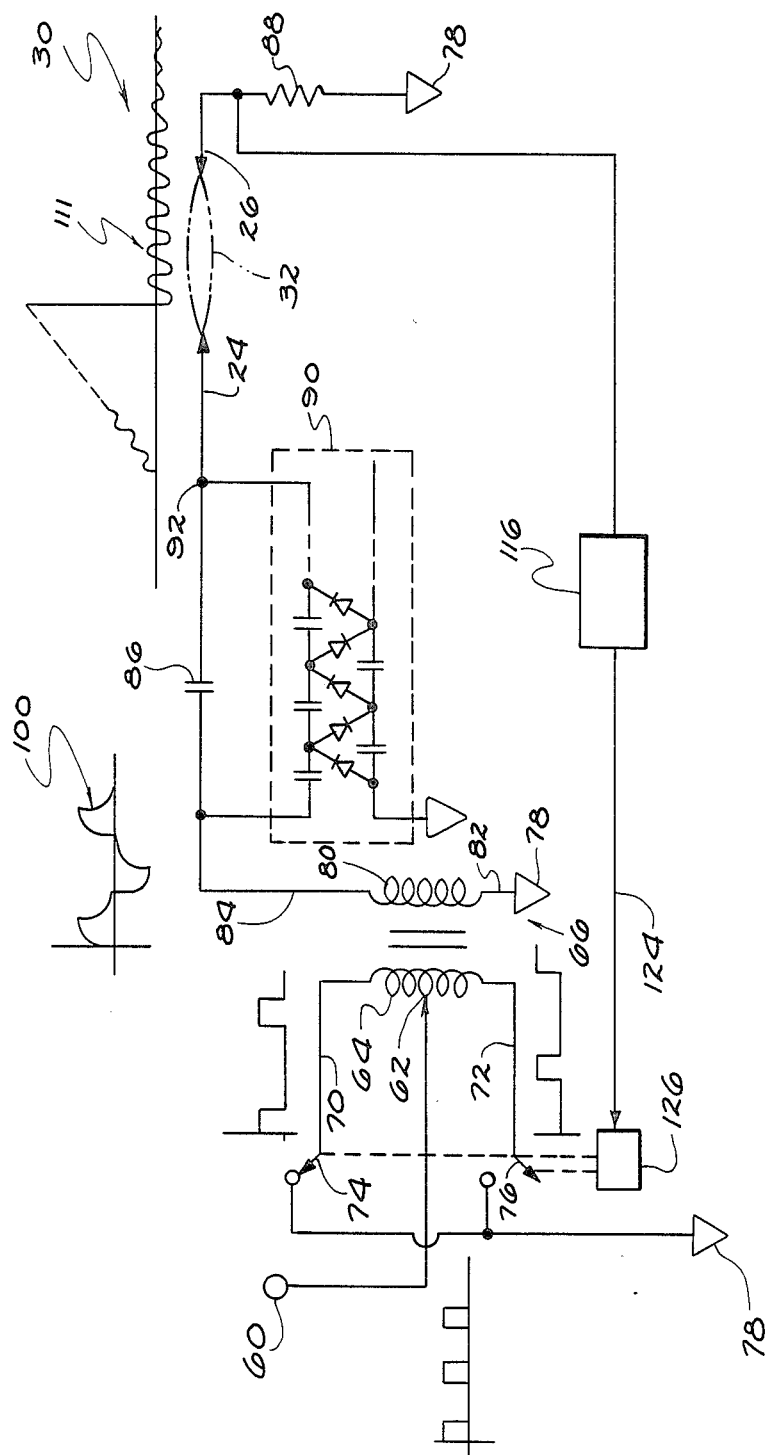
FIG. 3 is a schematic diagram of a circuit of the system of FIG. 1.

FIG. 3 is a schematic diagram of a circuit (not invented by applicant) that was used to generate the required current and voltage at the high frequencies. The circuit includes a DC voltage source 60 of moderate ripple, which is connected to a center tap 62 of the primary winding 64 of a transformer 66. Opposite primary winding terminals 70, 72 are connected through switches 74, 76 to ground. The transformer has a secondary winding 80 which has one terminal 82 connected to ground 78, and another terminal 84 connected through a capacitor 86 to one of the electrodes 24. The other electrode 26 is connected through a resistor 88 to ground 78. The switches 74, 76 are closed and opened by a controller 126 at a frequency of 75 kHz, to transmit this frequency through the transformer.

The inductance of the secondary winding 80 and the reflected inductance of the primary winding 64, when combined with the capacitance of the capacitor 86, results in a resonant circuit which is resonant at 75 kHz. As a result, a substantially sinusoidal voltage and current, indicated at 111, is applied between the electrodes. At the beginning of each arc of perhaps five seconds duration, a voltage multiplier circuit 90 acts to produce a progressively greater voltage at the point 92, which reaches a high voltage such as 10,000 volts, at which time the gap between the electrodes breaks down and an arc is established. Thereafter, the voltage multiplier 90 serves no functions, and the voltage of perhaps 700 volts and current of about 30 milliamperes (root mean square) is applied between the electrodes. A feedback circuit 116 senses the arc current and controls the switch controller 126 to vary the duration during which each switch is closed, to maintain a predetermined average current through the gap between the electrodes.

Applicant has found that for the most common optic fiber having a diameter between 0.005 and 0.010 inch, an effective and reliable coupling lens can be formed by applying an AC current of a frequency of a plurality of thousands of cycles per second, at an amplitude of about 20 milliamperes root mean square (which varies between about 20 and 40 milliamperes for fibers of about 0.005 to 0.010 inch diameter, respectively lying in a cross-aperture of a contact), and which is continued for a period of between 3 and 7 seconds. This results in the tip 130 (FIG. 2) of the lens lying on an imaginary line 132 connecting the tips of the electrodes, with a lens about 50% greater in diameter than the fiber, with the area of intersection between the lens and the rest of the fiber being almost as flexible and strong (80% of the tensile strength) as the unlensed fiber, and with the surface of the lens being smooth and having very few crevices.

Thus, the invention provides a method and apparatus for melting an end portion of an optical fiber into a lens, which produces a lensed fiber of high strength having a lens surface of high quality. This is accomplished by applying an electric arc between electrodes lying on opposite sides of the fiber end portion, with the arc being of a plurality of seconds duration, and being terminated and reignited at a rate of a plurality of thousands of times per second. Higher quality is obtained with an interuption rate of over 10 kHz, and preferably over 100 kHz, as by applying an alternating current arc of a frequency of about 75 kHz. For fiber diameters between about 0.005 and 0.010 inch, the current is preferably of an average intensity of about 30 milliamperes, and is continued for a period of between 3 and 7 seconds. Applicant believes that the high frequency causes minute oscillations that are significant for the minute molten ball (under about 0.015 inch diameter for under about 0.010 inch fibers). Also, that they result in convective currents in the molten ball that better distribute heat in the glass of the optical fiber to resist weakening, and that homogenize the molten ball to avoid crevices in the lens. In any case, it is found that the high frequency does produce more reliable lensed fibers.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for forming an end portion of an optical fiber into a lens comprising:
    establishing a pair of electrodes with their tips on opposite sides of said fiber end portion, and with said fiber end portion lying on an imaginary line connecting said electrode tips;
    establishing an arc between said electrode tips, and continuing said arc at a sufficient average current and time to melt said end portion into a lens of a diameter at least about 25% greater than the 2. The method described in claim 1 wherein:
    said optical fiber has a diameter of no more than about 0.010 inch, and said step of establishing an arc includes terminating and restarting said arc a plurality of tens of thousands of times per second.

3. Apparatus for forming an end portion of an optical fiber into a lens comprising:
    a pair of electrodes having spaced tips;
    means for holding said fiber end portion between said electrode tips, and with said fiber end portion lying on an imaginary line connecting said electrode tips;
    circuit means coupled to said electrodes for applying electricity to them which establishes an arc between said electrode tips of an intensity and duration which melts said fiber end portion into a lens having a greater diameter than said fiber;
    said circuit being constructed to apply a current between said electrode tips that varies between substantially zero and maximum amplitude at a rate of a plurality of thousands of times per second.

4. The apparatus described in claim 3 wherein:
    said fiber has a diameter of no more than about 0.010 inch, and said circuit is constructed to apply AC current at a frequency of over 10 kHz.

5. The apparatus described in claim 3 wherein:
    said fiber has a diameter of no more than about 0.010 inch, and said circuit is constructed to flow current that undergoes said variation in amplitude at a rate of at least about 100 kHz.

* * * * *

UNITED STATES PATENT AND TRADEMARK OFFICE
CERTIFICATE OF CORRECTION

PATENT NO. : 4,743,283

DATED : May 10, 1988

INVENTOR(S) : Leslie Morton Borsuk

It is certified that error appears in the above-identified patent and that said Letters Patent is hereby corrected as shown below:

Column 4, line 39, the following should be inserted after "the":

--diameter of said fiber;

said step of establishing an arc includes repeatedly terminating said arc and restarting it a plurality of thousands of times per second. --

Signed and Sealed this

Eleventh Day of October, 1988

*Attest:*

DONALD J. QUIGG

*Attesting Officer*      *Commissioner of Patents and Trademarks*